(No Model.)
E. NAGEL.
WATER HEATER.
No. 479,141. Patented July 19, 1892.
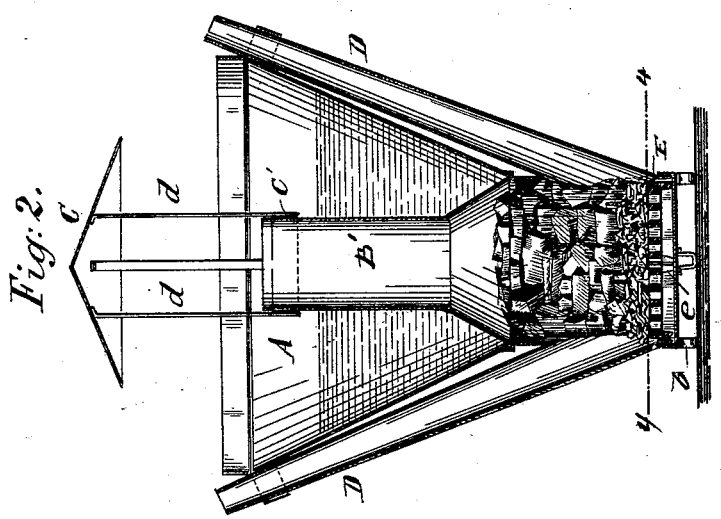
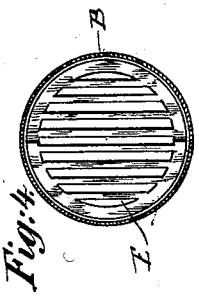
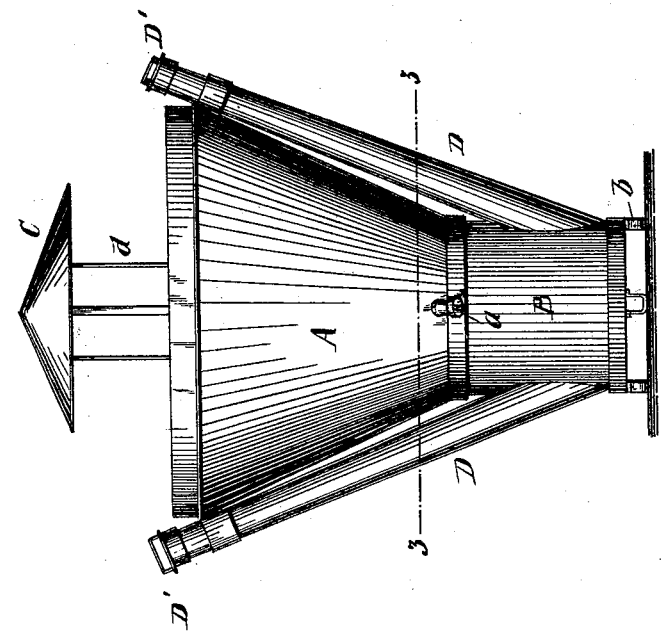
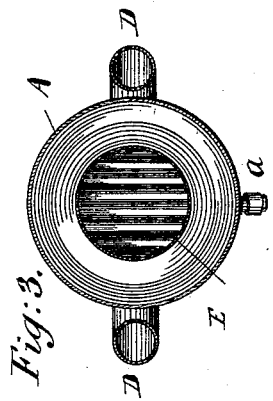
WITNESSES:
Marion Hall
Charles Schroeder.
INVENTOR
E. Nagel.
BY
Goepel & Raegener
ATTORNEYS.

UNITED STATES PATENT OFFICE.

EDUARD NAGEL, OF HOBOKEN, NEW JERSEY.

WATER-HEATER.

SPECIFICATION forming part of Letters Patent No. 479,141, dated July 19, 1892.

Application filed March 25, 1892. Serial No. 426,350. (No model.)

*To all whom it may concern:*

Be it known that I, EDUARD NAGEL, a citizen of the United States, and a resident of Hoboken, in the county of Hudson and State of New Jersey, have invented certain new and useful Improvements in Water-Heaters, of which the following is a specification.

This invention relates to an improved water-heater for the use of families residing in houses in which no hot-water arrangement is provided, said water-heater serving for heating quickly a certain quantity of water to the boiling-point, so as to be used for bathing and other purposes; and the invention consists of a water-heater composed of a conical vessel, a central furnace arranged in said vessel, a detachable grate formed of two parts, set into said furnace, a closed bottom for said furnace, a chimney extending from the furnace up through the center of the vessel, and air-tubes that extend from the upper part of the vessel or reservoir to the lower part of the furnace, so as to supply the required quantity of air necessary for combustion.

In the accompanying drawings, Figure 1 represents a side elevation of my improved water-heater. Fig. 2 is a vertical longitudinal section of the same. Figs. 3 and 4 are horizontal sections, respectively, on lines 3 3, Fig. 1, and 4 4, Fig. 2.

Similar letters of reference indicate corresponding parts.

Referring to the drawings, A represents an inverted conical vessel, which is open at the top and which is made of sufficient size to contain a considerable quantity of water, according to the purpose for which the heater is required. With the lower end of the vessel A is connected a cylindrical furnace B, which is closed at the bottom and provided with short legs $b$, on which the entire structure is supported. The upper part of the furnace is made of smaller diameter and extends in the form of a chimney B' through the center of the heating-vessel A, the chimney extending to a sufficient distance above the water-level, but preferably not beyond the rim of the vessel A. To the upper end of the chimney B' is supplied by a suitable keeper C' a hood C, which is supported by vertical stays or straps $d$ on the keeper C', so as to intercept any sparks or cinders that are emitted through the chimney when the fire in the furnace is started and deflect them so as to drop into the water in the boiler, so that any danger of fire is thereby avoided. The air required for combustion is conducted to the lower part of the furnace B by means of air-tubes D, which are arranged at two or more points of the furnace and which are extended in inclined position in upward direction and supported along the upper part of the rim of the vessel A by means of fastening-bands, as shown clearly in Figs. 1 and 2. The upper ends of the air-tubes D' are provided with detachable caps D, which are removed when the fire is started in the furnace, but replaced when the water is sufficiently heated, so that no further draft is required. The circular grate E, which is formed of two semicircular sections provided with feet $e$, is inserted through the chimney and supported on the bottom of the furnace B, the fuel, which is preferably charcoal, coke, or similar material, being dropped through the chimney B' onto the grate, preferably in glowing condition, until the furnace is entirely filled with the same up to the chimney. The slow combustion of the fuel will heat the body of water in the vessel A, the chimney being also utilized for heating purposes, as the products of combustion are carried up by the draft that is created in downward direction through the air-tubes and in upward direction through the chimney, so as to heat the walls of the same and thereby the body of water in the vessel.

If the glowing coal dropped into the furnace through the chimney should not be sufficient to heat the body of water in the vessel A, an additional quantity of charcoal or coke is placed on top of the glowing coals, which former is gradually ignited, so as to produce a quick and effective heat, by which the body of water in the vessel A is soon raised to the boiling-point. It is then drawn off into the washtub or other place of use through the discharge-faucet $a$, that is arranged near the bottom of the vessel A, as shown in Fig. 1. A hose may be attached to the faucet, so as to conduct the water to any desired point. After the water is drawn off for use the fire is allowed to burn out until the furnace becomes entirely cool. To remove the ashes and unburned coal particles, the heater is turned in inverted position, so that the ashes drop out through the chimney together with the grate-sections. After the ashes are dumped the heater is returned into its normal position, the grate-sections are replaced in the furnace of the same by dropping them through the chimney, and are placed in position by means of a poker. The hood is replaced in position on the chimney, and a certain quantity of water then placed in the vessel and glowing fuel put into the furnace, so that the heater is ready again for heating another quantity of water.

The entire device is made of suitable metal and may be made of any size, from the smaller sizes for domestic purposes to the larger sizes, which may be used for agricultural purposes for heating water for cattle-feed, &c.

The advantages of my improved water-heater are the simple and cheap construction of the same, the safety against fire, inasmuch as there are no open parts through which any coal can drop out; that it can be used anywhere in or out of doors, as the wind does not affect the same, and that the same can be conveniently handled, as the upper ends of the air-tubes serve as handles in lifting and turning the heater.

Having thus described my invention, I claim as new and desire to secure by Letters Patent—

1. A water-heater consisting of a conical vessel or reservoir, a furnace closed at the bottom and extending into the lower part of the vessel, a chimney passing through the vessel, inclined air-tubes extending from the furnace to the upper part of the vessel, and a grate in the furnace, substantially as set forth.

2. A water-heater composed of a conical vessel or reservoir, a cylindrical furnace provided with a closed bottom and extending into the lower part of the vessel, air-tubes extending from the lower part of the furnace to the upper part of the heating-vessel and being attached to the latter by a fastening device, the chimney extending from the upper part of the furnace up through the center of the vessel, a hood supported above the chimney, and a grate formed of two semicircular sections, located near the bottom of the furnace, substantially as set forth.

In testimony that I claim the foregoing as my invention I have signed my name in presence of two subscribing witnesses.

EDUARD NAGEL.

Witnesses:
PAUL GOEPEL,
CHARLES SCHROEDER.